Patented Mar. 7, 1944

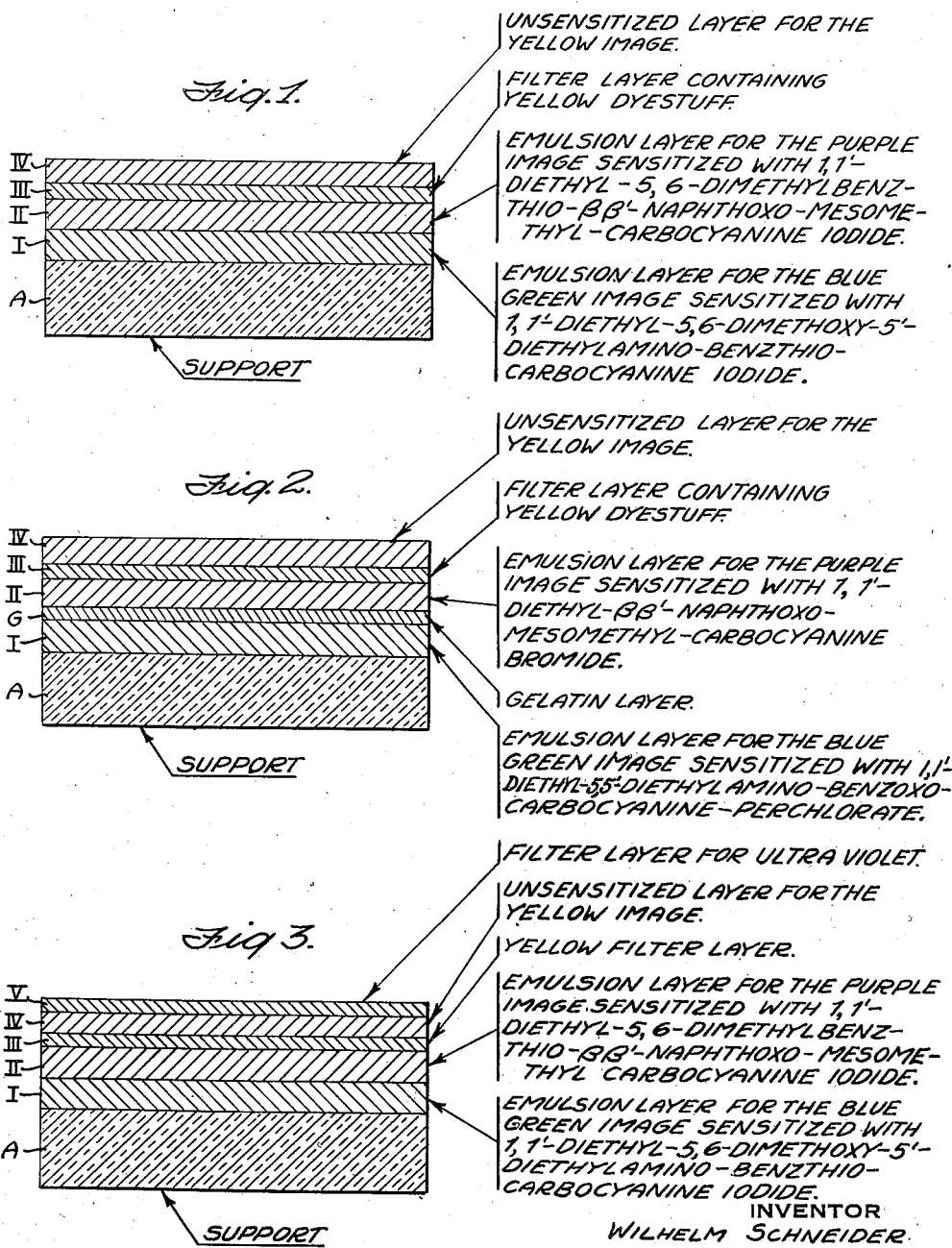

2,343,424

UNITED STATES PATENT OFFICE 2,343,424

SUBTRACTIVE COLOR PHOTOGRAPHY

Wilhelm Schneider, Dessau, Germany, assignor to General Aniline & Film Corporation, New York, N. Y., a corporation of Delaware Application September 10, 1940, Serial No. 356,143 In Germany April 27, 1937

3 Claims. (Cl. 95—2)

My present invention relates to an improved light-sensitive element for color photography. This application is a continuation-in-part of my application Ser. No. 199,349, filed April 1, 1938.

In the known subtractive processes for producing multicolor pictures multilayer exposure material is used in which the individual layers are sensitized for different regions of the spectrum. In order to obtain the best possible utilization of the light the sensitizing of the several layers is so chosen that the region of sensitivity of the several layers taken together is equal to and even exceeds the total range of the visible spectrum. In order to attain the best possible color separation the sensitizing dyestuffs are so selected that their sensitizing curves show a somewhat steep descent towards the long wave region. The maxima of the sensitizing range for the individual layers, in conformity with the sensitizing of the emulsion layers or the additive exposure process, lie in the middle of the three main regions of the visible spectrum, namely at about 450 m$\mu$, about 550 m$\mu$ and about 650 m$\mu$. In this respect reference may be made, for example, to the exposure material described in U. S. Patent No. 2,059,884, page 2, left column, lines 11 to 36, in which the green-sensitive layer is sensitized for the region of 510 to 590 m$\mu$ with a maximum at about 550 m$\mu$ and the red-sensitive layer is sensitized for the region of 600 to 700 m$\mu$ with a maximum at about 650 m$\mu$. Thus it was generally supposed in the art that for the red-sensitive layer a sensitization must be selected which embraces as far as possible the total red portion of the spectrum. Present day commercial photographic materials for subtractive multicolor photographs are therefore sensitized in this manner. With such a material there is attained a very good reproduction of color, if the time of exposure is correctly selected. However, under changing weather conditions very different results may be obtained, in particular in foggy and rainy weather the pictures may easily be bluish, whereas in cloudy but clear weather reddish pictures are obtained.

It is an object of the present invention to provide a photographic material for multicolor photography in which these disadvantages are avoided.

A further object is the provision of a color photographic light-sensitive element which will correctly register the color sensations impressed thereon by exposure under all possible weather conditions.

Further objects of the invention will become apparent from the following detailed description.

Reference is made to the accompanying drawing, the figures of which show diagrammatically and in an exaggerated scale light sensitive elements according to the invention. The figures are self-explanatory.

This invention is based on the observation that the aforementioned disadvantages are avoided in a multilayer photographic material the red-sensitive layer of which has a sensitizing range of from about 500 to about 670 m$\mu$ with a sensitizing maximum of about 580 to about 630 m$\mu$. The following is an especially suitable material: The blue-sensitive layer has a sensitive range of about 400 m$\mu$ to about 480 m$\mu$ with a maximum at about 430 m$\mu$ to about 460 m$\mu$, the green-sensitive layer has a sensitized region from about 460 m$\mu$ to about 610 m$\mu$ with a maximum at about 540 m$\mu$ to about 555 m$\mu$ and the red-sensitive layer a sensitized region of about 500 m$\mu$ to about 670 m$\mu$ with a maximum at about 580 m$\mu$ to about 630 m$\mu$. This photographic material is of special advantage when used together with an ultra-violet absorbing filter. Preferably this ultra-violet filter is used in the form of a filter layer on the photographic material. Such material shows when compared with the known material the advantage that a correct color reproduction is secured under varied conditions of weather. With this material, therefore, the varying content of infra-red and ultra-violet light in the daylight is without influence.

This material does not only exclude the influence of the weather conditions, but the color reproduction is also improved in other respects. Thus certain blue tints, for example of flowers and fabrics which hitherto have been reproduced in too red a color, are reproduced correctly. It is a further advantage that it is possible to obtain a soft gradation of the emulsion by a sensitization characterized by overlapping spectral ranges according to the present invention.

It will be apparent from the above disclosure that the most important feature of the invention is the special sensitizing of the layers. The color picture may be produced in the multilayer material in various ways. Especially serviceable are layers as described in U. S. patent application Serial No. 111,250, filed November 17, 1936; U. S. Patents 2,178,612, 2,179,228, 2,179,238, and 2,179,244, all of November 7, 1939; and U. S. Patents 2,186,730, 2,186,732, 2,186,733, 2,186,735, 2,186,849, and 2,186,851, all of January 9, 1940, in which the color pictures are produced by color forming development, by the silver bleaching-out process, or the anti-diazotate process. For producing the pictures the material may be subjected to a simple development or a reversal development, as described in U. S. patent application Serial No. 184,932, filed January 14, 1938, and U. S. Patents 2,159,466, of May 23, 1939; 2,179,234, of November 7, 1939; 2,229,137, of January 21, 1941; and 2,268,630, of January 6, 1942

The following examples illustrate the invention.

Example I

A support A (Figure 1) is coated with a silver halide gelatin emulsion layer I panchromatic sensitized with 1,1'-diethyl-5,6-dimethoxy-5'-diethylamino-benzthia-carbocyanine iodide and containing decyl - 1 - oxy - 2 - naphthoylamine as blue-green color forming component. The next emulsion layer II immediately superposed thereon is orthochromatic sensitized with 1,1'-diethyl-5,6 - dimethylbenzthio - $\beta\beta'$ - naphthoxo - mesomethyl-carbocyanine iodide. Said layer contains 1 - (m - stearyl - aminophenyl) - 3 - methyl - 5-pyrazolone as color forming component for the purple image. The last named layer is superposed by an intermediate filter layer III containing a yellow dyestuff which is capable of being washed out or bleached out. Finally the filter layer III is superposed by an unsensitized, i. e., blue sensitive emulsion layer IV containing decanoylamino-benzoyl-acetic-acid-p-anisidide.

Example II

In a multicolor film according to Example I containing the same color forming components the emulsion layers are sensitized as follows: Layer I (panchromatic): 1,1'-diethyl-5,6-dimethyl-5'-diethylamino-benzthio-carbocyanine iodide.

Layer II (orthochromatic): 1,1'-diethyl-$\beta\beta'$-naphthoxocarbocyanine iodide.

Example III

A multicolor material according to Figure 2 is built up as follows:

A support A. A panchromatic emulsion layer I sensitized with 1,1-diethyl-5,5'-diethylamino-benzoxo-carbocyanine-perchlorate containing a condensation product of a compound obtained by condensing a mixed polymerisate of vinylchloride and the anhydride of maleic acid with 1,5-aminonaphthole as blue-green color component. An emulsion layer II sensitized with 1,1'-diethyl-$\beta\beta'$-naphthoxo-mesomethyl-carbocyanine bromide containing a condensation product of a compound obtained by condensing a mixed polymerisate of vinylchloride and the anhydride of maleic acid with p-aminophenylmethylpyrazolone as purple component. The layer I is separated from layer II by a thin gelatin layer G. A filter layer III containing a yellow dyestuff which is capable of being washed out or bleached out. An unsensitized blue-sensitive emulsion layer IV containing the condensation product of a compound obtained by condensing the malonic monochloride and octylamine with aniline as color forming component for the yellow image.

Example IV

A multicolor material according to Figure 1 is built up as follows:

An emulsion layer I sensitized with 1,1'-diethyl - 5,6,5,6' - tetramethyl - benzseleno - carbocyanine iodide containing 1-abietylamino-5-oxynaphthalene-6-carboxylic acid. A layer II sensitized with 1,1'-diethyl-6-methoxy-benzseleno-6'-methoxy-quinopseudocyanine iodide containing 3 - abietylamino - 5 - sulfo - 1 - phenyl - 3-methyl-5-pyrazolone. A yellow filter layer III. An unsensitized blue sensitive emulsion layer IV containing p-abietylamino-benzoyl-acetic-acid-anilide-p-carboxylic acid.

Example V

In a multicolor material according to Example IV containing the same color forming components the emulsion layers are sensitized as follows:

Layer I: 1,1'-diethyl-5,5'-disulfoethyl-6,6'-dimethoxy-benzthio-carbocyanine bromide.

Layer II: 1,1'-diethyl-benzseleno-isocyanine iodide.

Example VI

A multicolor material according to Figure 3 is built up in the following manner:

A panchromatic emulsion layer I sensitized according to Example I containing 1-N-stearyl-4-N - (1' - oxy - 2' - naphthoyl) - phenylene-diamine-sodiumsulfate. An orthochromatic emulsion layer II sensitized according to Example I containing 1-(3'-sulfophenyl) - 3 - (4" - stearylaminophenyl)-5-pyrazolone. A yellow filter layer III. An unsensitized blue-sensitive emulsion layer IV containing m-stearyl-amino-benzoylacetanilide-p-carboxylic acid. A thin gelatin filter layer V transparent to light but absorbing the ultra-violet rays containing m-aminobenzoyl-diamino-stilbensodiumdisulfonate or other usual substances which absorb the invisible short waves of the spectrum and may contain groups capable of rendering the filter substance fast to diffusion.

What I claim is:

1. A light-sensitive element for color photography comprising a support, a blue-sensitive silver halide emulsion layer having a sensitive range from about 400 to about 480 m$\mu$ with a maximum at about 430 m$\mu$ to about 460 m$\mu$, a green-sensitive silver halide emulsion layer having a sensitized region from about 460 m$\mu$ to about 610 m$\mu$ with a maximum at 540 m$\mu$ to about 555 m$\mu$, and a red-sensitive silver halide emulsion layer having a sensitized region from about 500 m$\mu$ to about 670 m$\mu$ with a maximum at about 580 m$\mu$ to about 630 m$\mu$.

2. A light-sensitive element for color photography comprising a support, a blue-sensitive silver halide emulsion layer having a sensitive range from about 400 to about 480 m$\mu$ with a maximum at about 430 m$\mu$ to about 460 m$\mu$, a green-sensitive silver halide emulsion layer having a sensitized region from about 460 m$\mu$ to about 610 m$\mu$ with a maximum at 540 m$\mu$ to about 555 m$\mu$, and a red-sensitive silver halide emulsion layer having a sensitized region from about 500 m$\mu$ to about 670 m$\mu$ with a maximum at about 580 m$\mu$ to about 630 m$\mu$, said silver halide emulsion layers containing color formers fast to diffusion.

3. The light-sensitive element defined in claim 1, in which an ultra-violet absorbing filter layer is arranged in front of the blue-sensitive emulsion layer.

WILHELM SCHNEIDER.